United States Patent
Kawamoto et al.

(10) Patent No.: US 7,328,224 B2
(45) Date of Patent: Feb. 5, 2008

(54) APPARATUS AND METHOD FOR CONTROLLING USER INTERFACE

(75) Inventors: Hirokazu Kawamoto, Tokyo (JP); Masanori Aritomi, Tokyo (JP); Tomonori Minagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/391,408

(22) Filed: Mar. 29, 2006

(65) Prior Publication Data
US 2006/0167953 A1 Jul. 27, 2006

Related U.S. Application Data

(62) Division of application No. 09/995,724, filed on Nov. 29, 2001, now Pat. No. 7,228,314.

(30) Foreign Application Priority Data

| Nov. 30, 2000 | (JP) | 2000-364628 |
| Dec. 22, 2000 | (JP) | 2000-391377 |
| Dec. 28, 2000 | (JP) | 2000-402713 |

(51) Int. Cl.
*G06F 17/00* (2006.01)
(52) U.S. Cl. .......................... 707/104.1; 707/1; 707/3; 707/10; 358/1.13; 358/1.14
(58) Field of Classification Search .............. 707/1–10, 707/100–104.1; 358/1.11–1.18
See application file for complete search history.

(56) References Cited

U.S. PATENT DOCUMENTS

| 5,159,597 A | 10/1992 | Monahan et al. ............... 714/2 |
| 5,467,434 A | 11/1995 | Hower et al. ................ 358/1.15 |
| 5,500,715 A | 3/1996 | Ta et al. ......................... 399/1 |
| 5,708,798 A | 1/1998 | Lynch et al. .................... 703/1 |
| 5,899,985 A | 5/1999 | Tanaka ........................ 706/45 |
| 5,943,673 A | 8/1999 | Felouzis et al. ......... 707/104.1 |
| 5,978,559 A | 11/1999 | Quinion ..................... 295/114 |
| 5,999,945 A | 12/1999 | Lahey ........................ 707/200 |
| 6,024,505 A | 2/2000 | Shinohara .................. 400/605 |
| 6,388,687 B1 | 5/2002 | Brackett .................... 345/810 |
| 6,407,760 B1 | 6/2002 | Aritomi ..................... 345/352 |
| 6,563,519 B1 | 5/2003 | Minagawa ................. 345/764 |
| 6,614,550 B1 | 9/2003 | Minagawa ................ 358/1.15 |
| 6,662,235 B1 | 12/2003 | Callis et al. ................ 719/318 |
| 6,801,911 B1 | 10/2004 | Berstis ........................ 707/10 |
| 6,967,728 B1 * | 11/2005 | Vidyanand ................. 358/1.12 |
| 2002/0065807 A1 | 5/2002 | Kawamoto et al. ............ 707/1 |

FOREIGN PATENT DOCUMENTS

EP 0588513 3/1994

(Continued)

*Primary Examiner*—Isaac Woo
(74) *Attorney, Agent, or Firm*—Fitzpatrick, Cella, Harper & Scinto.

(57) ABSTRACT

The user describes in advance conflict process rules, which indicate descriptions for avoiding conflicts that occur between setup data, in a conflict process rule description file (301). An inference engine (302) refers to this conflict process rule description file (301) and generates complementary rules indicating complementary conflict avoidance descriptions. The complementary rules are implemented by generating inverse logic rules of given descriptions for a function, which are described to allow inference by analogy.

15 Claims, 17 Drawing Sheets

FOREIGN PATENT DOCUMENTS

| | | |
|---|---|---|
| EP | 0 637 157 | 2/1995 |
| JP | 64-046840 | 2/1989 |
| JP | 02-197862 | 8/1990 |
| JP | 04-251871 | 9/1992 |
| JP | 06-035647 | 2/1994 |
| JP | 06-059846 | 3/1994 |
| JP | 07-044477 | 2/1995 |
| JP | 07-311670 | 11/1995 |
| JP | 09-054671 | 2/1997 |
| JP | 09-138743 | 5/1997 |
| JP | 09-198191 | 7/1997 |
| JP | 10-049318 | 2/1998 |
| JP | 11-126129 | 5/1999 |
| JP | 2000-127565 | 5/2000 |
| JP | 2000-227847 | 8/2000 |
| JP | 2000-276010 | 10/2000 |
| JP | 2001-027944 | 1/2001 |
| JP | 2001-195166 | 7/2001 |
| JP | 2002-196905 | 7/2002 |
| WO | 00/03340 | 1/2000 |

* cited by examiner

301

Collate(OFF) <- Group(ON).    (1)

Collate(OFF) <- Staple(ON).    (2)

Group(OFF) <- Layout(BOOKLET).    (3)

Collate(OFF) <- Group(ON).  (1)

Collate(OFF) <- Staple(ON).  (2)

Group(OFF) <- Layout(BOOKLET).  (3)

Collate(ON) <- true.  (4)

Group(ON) <- true.  (5)

Collate(_X) <- status(Collate,_X).  (6)

Group(_X) <- status(Group,_X).  (7)

Layout(_X) <- status(Layout,_X).  (8)

Staple(_X) <- status(Staple,_X).  (9)

FIG. 10

Collate(OFF) <- Group(ON). (1)

Collate(OFF) <- Staple(ON). (2)

Group(OFF) <- Layout(BOOKLET). (3)

{disable}

Collate(ON) <- true. (4)

Group(ON) <- true. (5)

Collate(_X) <- status(Collate,_X). (6)

Group(_X) <- status(Group,_X). (7)

Layout(_X) <- status(Layout,_X). (8)

Staple(_X) <- status(Staple,_X). (9)

FIG. 11

Collate(OFF) <- Group(ON). (1)

Collate(OFF) <- Staple(ON). (2)

Group(OFF) <- Layout(BOOKLET). (3)

{disable}

{Message(MSG001)}

Collate(ON) <- true. (4)

Group(ON) <- true. (5)

Collate(_X) <- status(Collate,_X). (6)

Group(_X) <- status(Group,_X). (7)

Layout(_X) <- status(Layout,_X). (8)

Staple(_X) <- status(Staple,_X). (9)

FIG. 13

CONFLICT PROCESS RULE

```
<CONFLICT RULES>
    <CONFLICT RULES, UNIVERSAL>
        <RULE>Booklet(OFF) <- Duplex(ON).</RULE>
        <RULE>Duplex(OFF) <- PaperSize(POSTCARD).</RULE>
        <RULE>Duplex(OFF) <- MediaType(TRANSPARENCY).</RULE>
        ...
    </CONFLICT RULES, UNIVERSAL>
    <CONFLICT RULES, LOCAL>
        <RULE>LayoutId("POSTER") <- Duplex(ON).</RULE>
        ...
    </CONFLICT RULES, LOCAL>
</CONFLICT RULES>
```

FIG. 16

Staple(OFF) <- Collate(ON).  (1)

Staple(OFF) <- Group(ON).  (2)

Staple(OFF) <- Finisher(OFF).  (3)
{disable}

Staple(OFF) <- StaplablePaper(OFF).  (4)
{disable}

Staple(OFF) <- Layout(BOOKLET).  (5)
{disable}

Staple(OFF) <- PaperType(OHP).  (6)
{disable}

Collate(ON) <- Layout(BOOKLET).  (7)
{disable}

Group(OFF) <- Layout(BOOKLET).  (8)
{disable}

APPARATUS AND METHOD FOR CONTROLLING USER INTERFACE

This application is a divisional of application Ser. No. 09/995,724, filed Nov. 29, 2001, now U.S. Pat. No. 7,228,314 the contents of which are incorporated by reference herein.

FIELD OF THE INVENTION

The present invention relates to a user interface control apparatus and method for avoiding conflicts between setup data for a predetermined object to be controlled, which are input via a user interface.

BACKGROUND OF THE INVENTION

As an example of an apparatus which accepts a plurality of setup values input from the user via a user interface (to be also referred to as "UI" hereinafter), and is controlled based on these setup values, an image forming apparatus (printer apparatus) is known. In general, a printer apparatus comprises a printer driver for controlling a print process, and the printer driver includes a UI that accepts print setups and the like from the user.

Every time the printer driver accepts a setup value input from the user via the UI, it evaluates the relationship between the currently input setup value and an associated one of a plurality of setup values set so far, and checks if conflicts occur between the setup values. Examples of conflicts include a setup disadvantageous for the user (e.g., a setup of a two-sided print process for an OHP sheet set as a print medium), a setup that makes a printer execute impossible operations, and the like.

If any conflicts are found, a conflict process for eliminating such conflicts must be executed.

Conventionally, it is a common practice to use a dedicated conflict process program that discriminates conflicts and executes a conflict process depending on the relationship between setup values. Alternatively, a plurality of setup value conditions that require a conflict process are saved in the form of a list in, e.g., a file, which is loaded by a conflict process program, thus preventing the conflict process program from depending on a specific setup value, and allowing general-purpose use of that conflict process program.

However, in order to implement them, a program developer or the like must exhaustively describe all conflict process rules. For this reason, when dependency among setup values is complicated, not all conditions can be perfectly exhaustively described.

Conventionally, rules are described based on combinations, and only one-to-one objective function control is available. Upon adding a new rule, an input person must check the entire description. The input volume is very large since data must be generated to exhaustively cover all combinations. Also, since rules are described together, they contain repetitive descriptions and input errors with high possibility, and a huge number of correction steps are required.

In the conflict process program, a conflict manager that controls a conflict process is designed to have high maintainability independently from a main program so as to generally use conflict process rules. With this design, the conflict manager is seen as a black box from the main program.

However, in practice, the main program must update the UI, and an update process of the UI is required upon a change in specific setup value which does not influence the conflict process. Conventionally, in such case, the main program cannot selectively process corresponding items but must refresh a given range as a whole, resulting in poor processing efficiency of the main program.

Such update process may be determined based on a difference of a data structure as a mediation between the main program and conflict manager, but this method also suffers poor efficiency. In addition, when grayout and display/non-display of control are changed, it is hard to extract them, thus worsening efficiency.

SUMMARY OF THE INVENTION

The present invention has been made in consideration of the aforementioned problems, and has as its object to provide a user interface control apparatus and method, which can implement an exhaustive, reliable conflict process, and can reduce the number of input steps and contrived errors by a program developer or the like by improving a description method of conflict process rules.

The present invention has been made in consideration of the aforementioned problems, and has as its object to provide a user interface control apparatus and method, which allow a main program and conflict manager in a conflict process program to exchange only information of items changed by a conflict process, while maintaining their independence, thereby improving the processing efficiency of the main program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 7 shows an example of conflict process rules in the embodiment;

FIG. 10 shows an example of conflict process rules in the embodiment;

FIG. 11 shows an example of conflict process rules in the embodiment;

FIG. 13 shows a description example of conflict process rules in a markup language in the embodiment;

FIG. 16 shows an example of conflict processing rules in another embodiment.

DESCRIPTION OF THE PREFERRED EMBODIMENTS (Hardware Arrangement)

Figure 1:
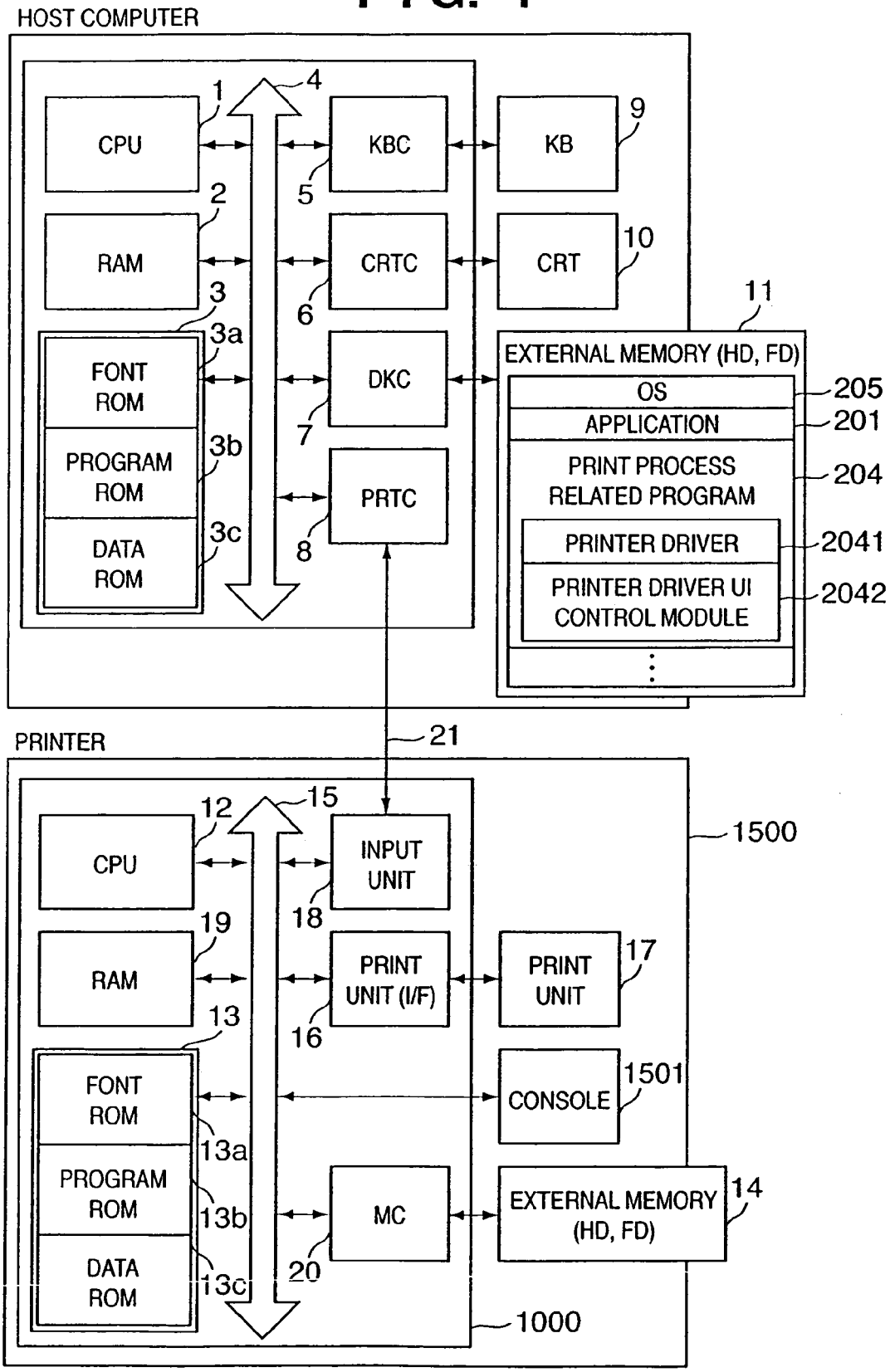
FIG. 1 is a block diagram showing the arrangement of a print processing system according to an embodiment of the present invention.

FIG. 1 is a block diagram showing the arrangement of a print processing system according to an embodiment of the present invention. The print processing system comprises a host computer 3000 and printer 1500.

In the host computer 3000, reference numeral 1 denotes a CPU for systematically controlling respective devices connected to a system bus 4; and 2, a RAM serving as a main memory, work area, and the like of the CPU 1. Reference numeral 3 denotes a ROM for storing various programs and data. The ROM 3 is partitioned into a font ROM 3a for storing various fonts, a program ROM 3b for storing a boot program, BIOS, and the like, and a data ROM 3c for storing various data.

Reference numeral 5 denotes a keyboard controller (KBC) for controlling key inputs from a keyboard 9 and a pointing device (not shown). Reference numeral 6 denotes a CRT controller (CRTC) for controlling display of a CRT display (CRT) 10.

An external memory 11 (access to which is controlled by a disk controller (DKC) 7) comprises a hard disk (HD), floppy disk (FD), or the like, and stores an operating system program (to be referred to as an OS hereinafter) 205, various applications (for example, a document processing application program for implementing a document process of a document including figures, images, text, tables, and the like together) 201, a print process related program 204, and also user files, edit files, and the like. The print process related program 204 includes a printer control command generation module (to be referred to as a "printer driver" hereinafter) 2041 and printer driver UI control module 2042.

Reference numeral 8 denotes a printer controller (PRTC) which is connected to the printer 1500 via a two-way interface 21 and executes a communication control process with the printer 1500.

The applications stored in the external memory 11 are loaded onto the RAM 2, and are executed by the CPU 1. The CPU 1 also executes a rasterize process of outline fonts on the RAM 2 to obtain a WYSIWYG (What you see is What you get) environment on the CRT 10. Furthermore, the CPU 1 opens various registered windows based on commands designated by, e.g., a mouse cursor (not shown) on the CRT 10, and executes various processes. Upon executing a print process, the user opens a print setup window (controlled by the printer driver UI control module 2042), and can make printer setups and print process setups for the printer driver 2041 as well as selection of a print mode.

In the printer 1500, reference numeral 12 denotes a CPU for controlling the overall printer 1500. Reference numeral 19 denotes a RAM which serves as a main memory, work area, and the like of the CPU 12, and is used as an output information rasterize area, environment data storage area, NVRAM, and the like. The memory size of the RAM 19 can be expanded by an option ROM connected to an expansion port (not shown). Reference numeral 13 denotes a ROM which includes a font ROM 13a for storing various fonts, a program ROM 13b for storing a control program and the like, and a data ROM 13c for storing various data.

An external memory 14 (access to which is controlled by a memory controller (MC) 20) comprises a hard disk (HD), floppy disk (FD), IC card, or the like, which is connected as an option, and stores font data, emulation programs, form data, and the like. When no external memory 14 such as a hard disk or the like is connected, the data ROM 13c of the ROM 13 stores information and the like used by the host computer 3000. Note that the number of external memories 14 is not limited to one, but a plurality of external memories may be connected. For example, a plurality of option font cards in addition to built-in fonts and external memories that store programs for interpreting printer control languages of different language systems may be connected.

A console 1501 has a control panel for accepting user's operations, and operation switches, LED indicators, and the like are arranged on the control panel (not shown). The console 1501 may have an NVRAM (not shown), and may store printer mode setup information input from the control panel.

The printer CPU 12 outputs an image signal as output information to a print unit (printer engine) 17, which is connected to the system bus 15, on the basis of the control program or the like stored in the program ROM 13b in the ROM 13. The CPU 12 can communicate with the host computer 3000 via an input unit 18, and can inform the host computer 3000 of information and the like in the printer 1500.

(Software Configuration)

Figure 2:
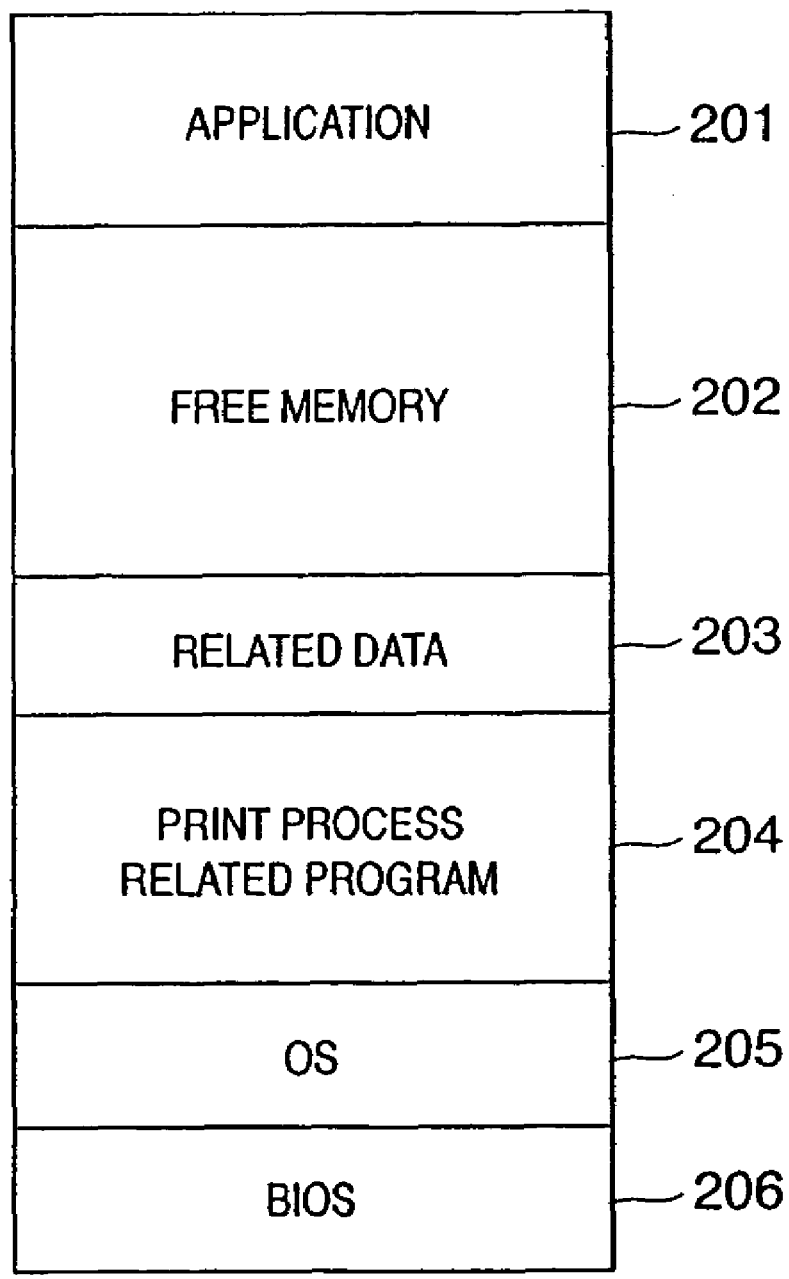
FIG. 2 shows a memory map of a RAM 2 in the embodiment.

FIG. 2 shows a memory map of the RAM 2 after a predetermined application and print process related program are launched and are loaded onto the RAM 2 on the host computer 3000. As shown in FIG. 2, a BIOS 206, OS 205, application 201, print process related program 204, and related data 203 are loaded onto the RAM 2, and a free memory area 202 is also assured. In this way, the application 201 and print process related program 204 are ready to run.

The printer driver UI control module 2042 in the print process related program 204 displays a print setup window as a printer driver UI on the CRT 10 in response to a print setup command input by the user, and allows user's setups.

Figure 8:
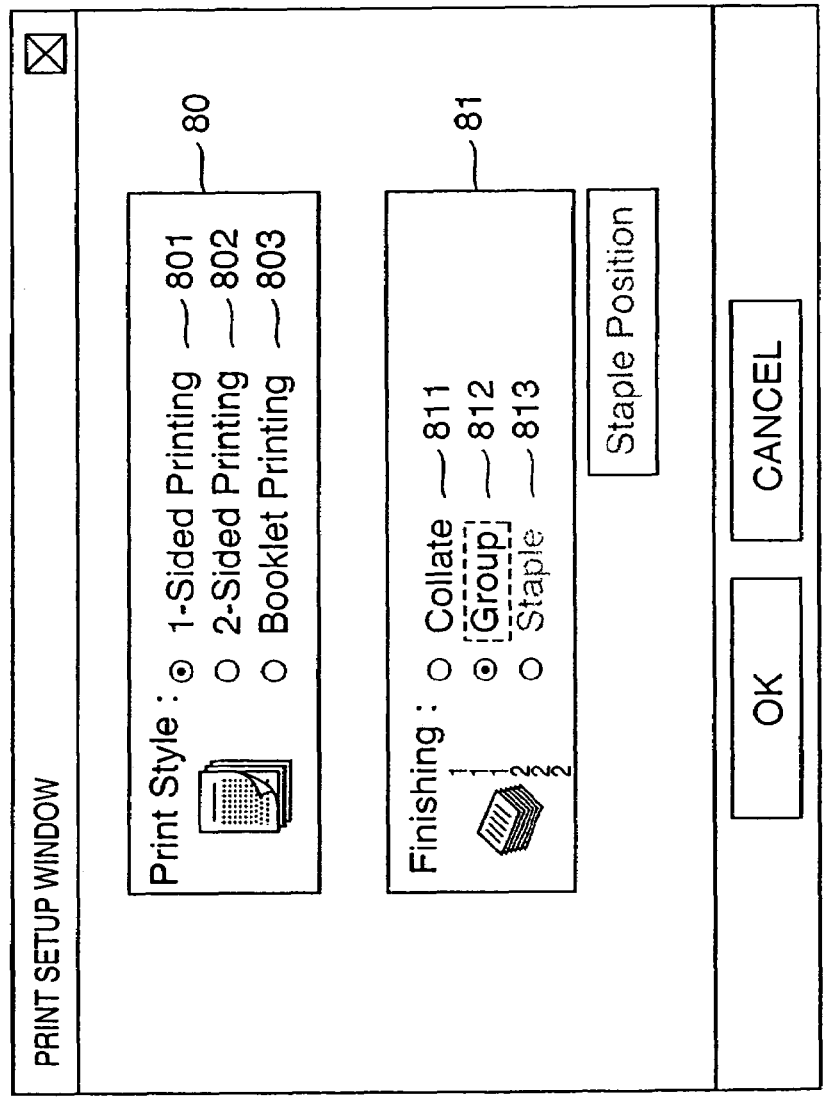
FIG. 8 shows an example of a print setup window in the embodiment.

FIG. 8 shows a display example of the print setup window. Referring to FIG. 8, a [Print Style] column 800 is used to designate a print layout, and the user can designate one of, e.g., 1-Sided Printing 801, 2-Sided printing 802, and Booklet Printing 803.

A [Finishing] column 81 is used to designate the output order of printed print media, and finishing, and the user can designate one of the following items.

[Collate] 811:

copy set printing. When M copies of a document including N pages are to be printed, the document is output sheet by sheet in the order of the first page, second page, . . . , N-th page, and this process is repeated M times.

[Group] 812:

page unit printing. When M copies of a document including N pages are to be printed, the document is output in the order of M first pages, M second pages, . . . , and M N-th pages.

[Staple] 813:

staple finishing. The document is output in units of sets like in [Collate] 811, and output sheets are stapled by a stapler for respective copy sets as finishing.

In this specification, the aforementioned user settable items will be referred to as "printer functions" or "functions" simply. Many other printer functions are available, but a description thereof will be omitted for the sake of simplicity.

Figure 9:
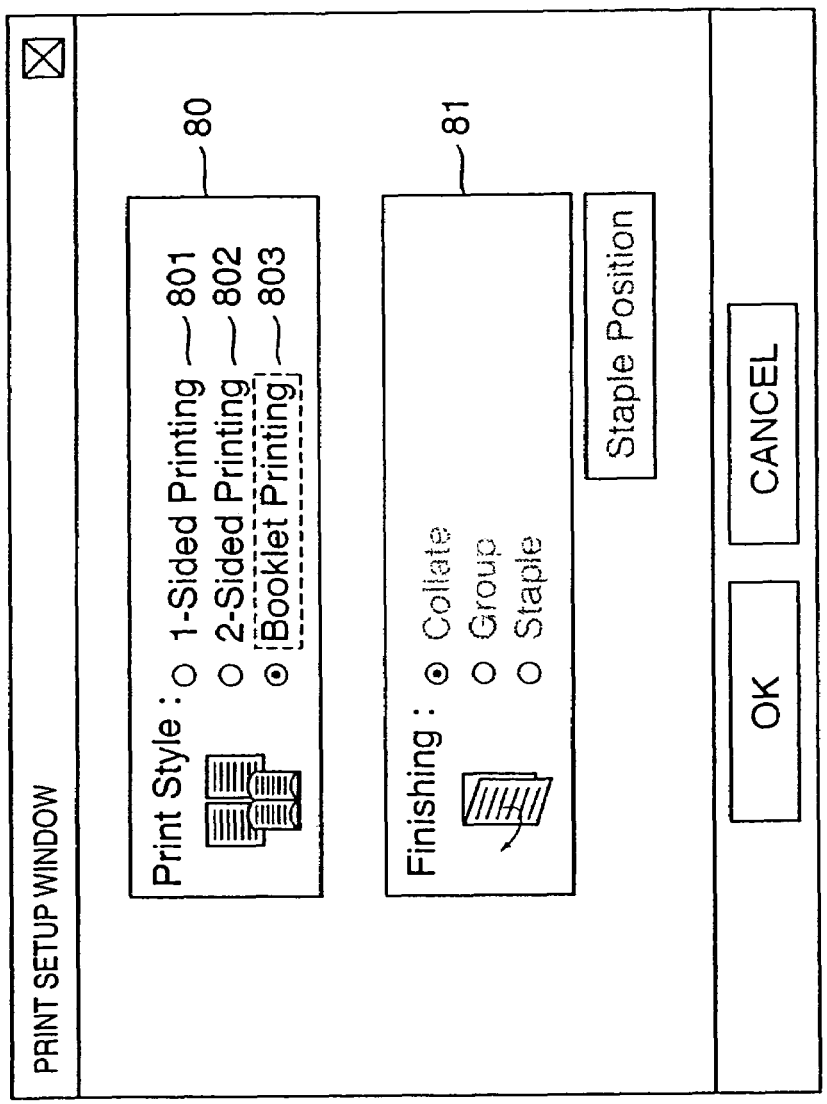
FIG. 9 shows an example of a print setup window in the embodiment.

Note that the printer driver UI control module 2042 is designed to avoid setup combinations disadvantageous for the user and insignificant setup combinations, i.e., conflicts between setup values, by a conflict process (to be described in detail below). For example, in FIG. 8, 1-Sided Printing 801 is designated as a print layout, and [Staple] 813 in the [Finishing] column 81 is displayed in light gray and is not available. Also, when Booklet Printing 803 is designated as a print layout, as shown in FIG. 9, none of the items in the [Finishing] column 81 are available. The above examples are very simple ones, and a considerable number of conflicts may be expected in practice. Details of the conflict process will be explained below.

Figure 3:
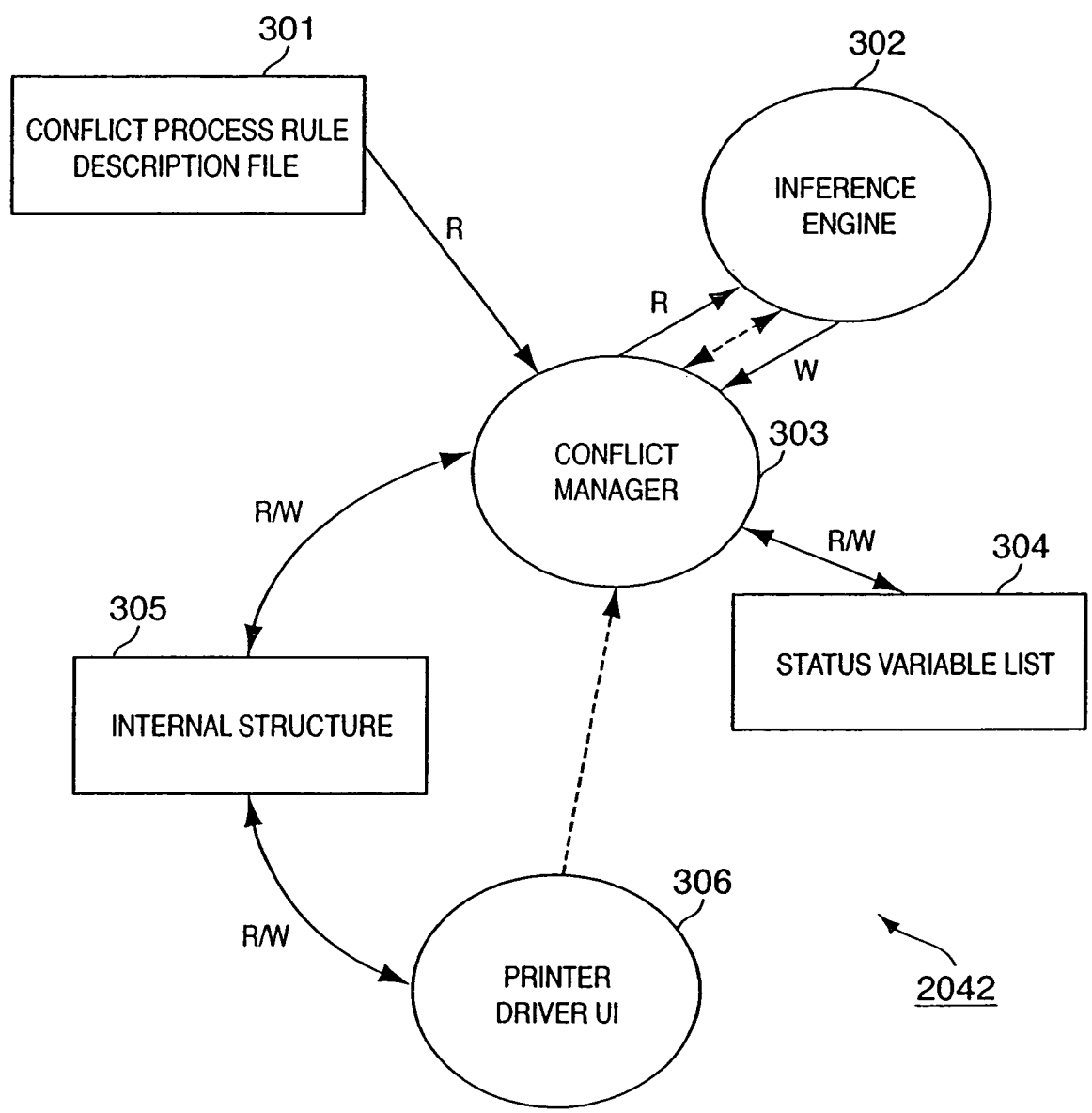
FIG. 3 is a schematic diagram of a printer driver UI control module in the embodiment.

FIG. 3 shows a schematic configuration of the printer driver UI control module 2042 in the print process related program 204 in this embodiment. Reference numeral 303 denotes a conflict manager for managing exchanges of data among modules, update of data, and the like to control the conflict process. Reference numeral 306 denotes a printer driver UI as the print setup window display. Reference numeral 301 denotes a conflict process rule description file that enlists conflict process rules indicating conflict avoidance descriptions described in a description format to be described later. Reference numeral 302 denotes an inference engine for generating a new conflict process rule by loading the conflict process rule description file 301; and 304, a status variable list that displays the states of respective printer functions in the form of a list, and can be updated on the basis of user's inputs and the contents of the conflict process rule description file 301. Reference numeral 305 denotes an internal structure as a slip which becomes a source of window display provided by the printer driver UI 306. The internal structure 305 displays the status values of respective printer functions in a predetermined format in association with the contents of the status variable list 304.

The conflict process rule description file 301 describes principal rules as a framework in advance by a developer. The inference engine 302 automatically generates a new conflict process rule by a method to be described in detail later, and additionally writes that rule in the conflict process rule description file 301.

Upon receiving user's setup information via the printer driver UI 306, the conflict manager 303 refers to the conflict process rule description file 301. This process is indicated as "R (Read)" by an arrow from the conflict process rule description file 301 toward the conflict manager 303, as shown in FIG. 3. When the setup information matches a given conflict process rule as a result of reference, the conflict process is applied. In this way, the conflict manager 303 updates the status variable list 304 and internal structure 304, and reflects the updated contents in the printer driver UI 306. This update process is indicated as "R/W (Read/Write)" by double-headed arrows that connect the conflict manager 303 to the status variable list 304 and internal structure 305, as shown in FIG. 3.

Figure 4:
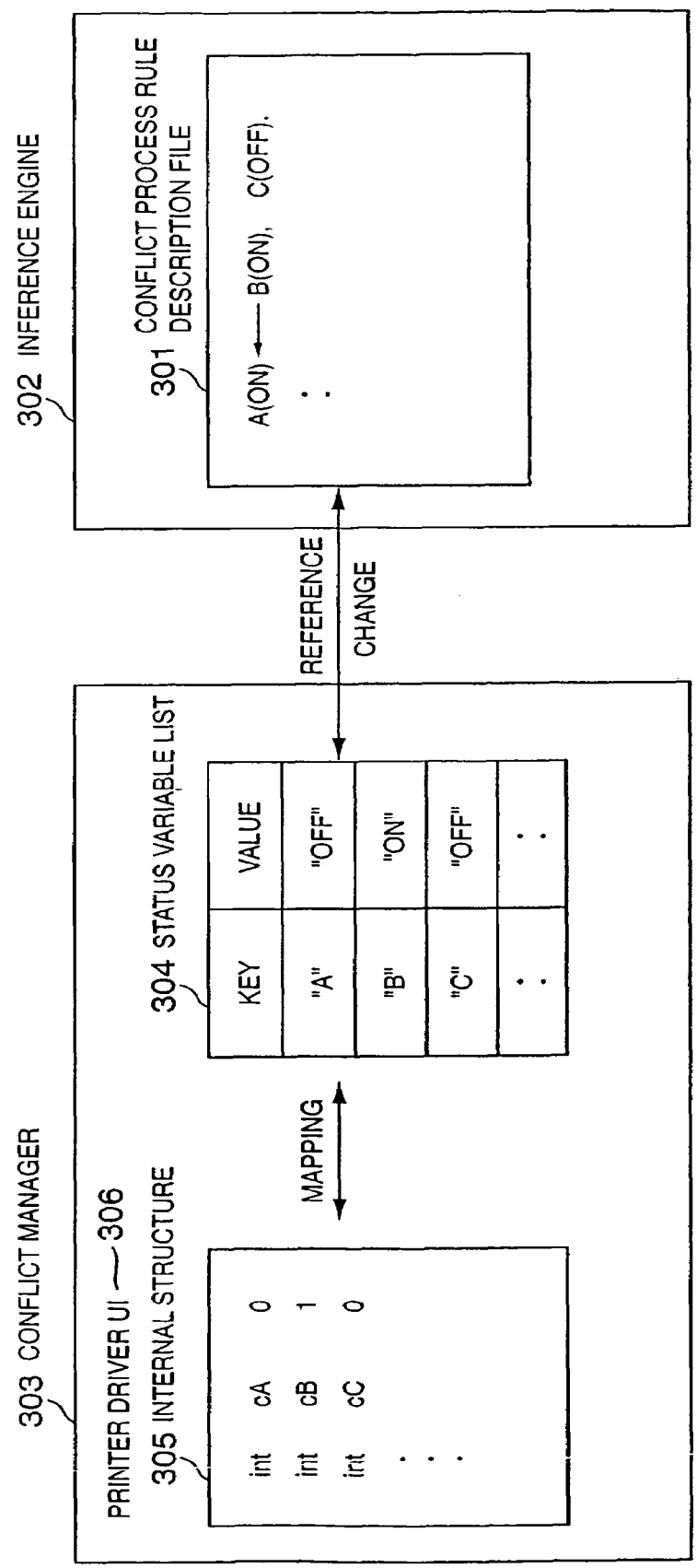
FIG. 4 is a view for explaining the relationship among data handled by the printer driver UI control module in the embodiment.

FIG. 4 is a view for explaining the relationship among data handled by the respective modules shown in FIG. 3. Referring to FIG. 4, the conflict process rule description file 301 is referred to while being included (loaded) in the inference engine 302, and a new rule is additionally written. The conflict process rule description file 301 is also referred to by the conflict manager 303, and the status variable list 304 is updated as a result of reference. Since the internal structure 304 and status variable list 304 are displayed in association with each other, as described above, they are mapped to each other. This state is expressed by the printer driver UI 306 in a form visible to the user.

The internal structure 305 expresses members corresponding to printer function names A, B, and C by cA, cB, and cC, respectively.

(Description Format of Conflict Process Rules)

The conflict process rule description file 301 will be described below.

Conventionally, one-to-one descriptions of function names and a description method that puts a function name group in { } are based on combinations. For this reason, an exhaustive description is required. As described above, to solve this problem, the developer describes principal rules, and for example, inverse rules estimated from these rules are automatically generated by the inference engine 302 (to be described in detail later).

An outline of the rule description format is as follows.

Declaratory knowledge is expressed by logic.

Conflict process rules are mathematically formalized using logic.

Knowledge can be categorized into universal knowledge (e.g., knowledge that can be commonly applied to a plurality of objects to be controlled) and local knowledge (e.g., knowledge that can be applied to only a specific object to be controlled). Universal knowledge is inclusive.

AND logic is described. OR is excluded by dividing it into a plurality of rules. Use of NOT is inhibited.

A function is described in the form of a predicate having one argument.

A rule that can be derived from another description is not repetitively described.

From this outline, the description method of each rule is substantiated. The basic format of a description of each rule is as follows.

A function name(ON), function name(OFF), and function name(value) are described on the left-hand side.

When logic for a true function is entered, all rules for (ON) are described. Rules for (OFF) need not be described (since they are automatically generated, as will be described later).

When logic for a false function is entered, all rules for (OFF) are described. Rules for (ON) need not be described (since they are automatically generated, as will be described later).

On the right-hand side, logic for establishing the left-hand side is described using function name(ON), function name(OFF), and function name(value). A plurality of terms can be described. Also, NOT can be used.

As described above, conflict process rules are mathematically formalized using logic. A predicate is described in the form of "printer function name(argument)". As the argument, a numerical value may be used in addition to ON/OFF (for example, the number of copies to be printed or the like). Printer function name(argument) is described on the left-hand side, logic for establishing the left-hand side is described on the right-hand side, and they are related using symbol "←" or "<-". For example, $$A(ON) \leftarrow B(ON).$$

is a rule which means that "when the state of printer function B is ON, the state of printer function A is set ON".

Symbol "," in a formula is used to mean "AND". For example, a rule "when the state of printer function B is ON and the state of printer function C is OFF, the state of printer function A is set ON" is described by:

$$A(ON) \leftarrow B(ON), C(OFF).$$

The aforementioned logical expression may be described in a form that complies with a declarative/logic language, and some description methods and inverted expressions of some notations and the right- and left-hand sides may be considered as the same form. Notations of function names, ON/OFF, and ( ) are appropriately designed, and may be defined to allow description in a markup language in consideration of exchange via a network (a description example in the markup language will be described later).

Figure 6:
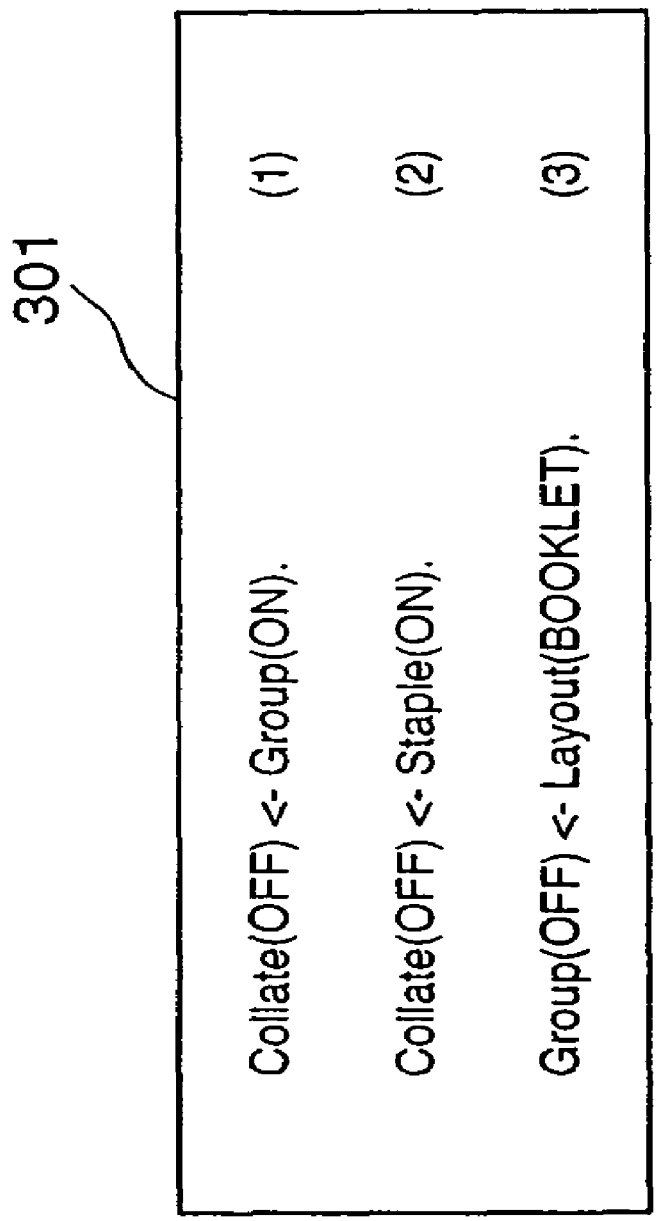
FIG. 6 shows an example of conflict process rules in the embodiment.

FIG. 6 shows an example of the conflict process rule description file described according to the aforementioned example. In FIG. 6, as printer functions, a copy set print function corresponding to [Collate] 811, page unit print function corresponding to [Group] 812, and staple finishing function corresponding to [Staple] 813 shown in FIG. 8 are respectively expressed by Collate( ), Group( ), and Staple( ), and an argument is ON or OFF. A print layout function corresponding to the [Print Style] column 80 is expressed by Layout( ), and an argument is one of 1-Sided, 2-Sided, and Booklet.

(1) in FIG. 6 indicates a rule that sets Collate(OFF) when Group(ON) is set since the user checks [Group] 812. (2) indicates a rule that sets Collate(OFF) when Staple(ON) is set. (3) indicates a rule that sets Group(OFF) when Layout (Booklet) is set.

(Automatic Generation of Conflict Process Rule)

A developer describes all rules which become ON for a given function name, and can omit rules that become OFF. Rules that become OFF are automatically generated by the inference engine 302.

Conversely, a developer describes all rules which become OFF for a given function name, and can omit rules that become ON. Rules that become ON are automatically generated by the inference engine 302.

A developer can describe all rules which become ON and those which become OFF for a given function name. In this case, no rules are automatically generated.

When an item is described on the right-hand side for a term which is described on the left-hand side in the form of function name(ON) and function name(OFF), the same ON/OFF format as that of the left-hand side is used. In this case, a rule is automatically generated.

The following explanation will be given using typical notations.

A necessary and sufficient conditional relationship between the right- and left-hand sides in a logical expression will be supplemented below.

If only one line of a rule $$A(ON) \leftarrow B(ON). \qquad (a)$$

is described, B(ON) is a sufficient condition for A(ON), and A(ON) is a necessary condition for B(ON). Therefore, the following rules of converse conditions do not generally prove to be the case of "the converse is also true".

$$B(ON) \leftarrow A(ON). \qquad (b)$$

$$A(OFF) \leftarrow B(OFF). \qquad (c)$$

When (a), (b), and (c) hold at the same time, A(ON) and B(ON) have a relationship of necessary and sufficient condition therebetween. The following rule as contraposition to (a)

$$B(OFF) \leftarrow A(OFF). \qquad (d)$$

is always true. Therefore, when (a), (b), and (c) hold at the same time, if the developer describes one of (a) and (d), the inference engine 302 can automatically generate conflict conditions (rules).

The relationship between the description method of process rules and logic to be automatically generated will be explained below.

When a rule which has a 2-status value (ON, OFF) as a value is described in a plurality of lines for an identical function name, only one of ON and OFF is described in the left-hand side in principle. For example, $$A(ON) \leftarrow B(ON), C(OFF).$$

$$A(ON) \leftarrow D(V1).$$

$$B(OFF) \leftarrow E(OFF).$$

where argument V1 represents a numeral value. For these rules, the inference engine 302 automatically generates ON/OFF-inverted rules as complementary rules.

$$A(OFF) \leftarrow true. \qquad (e)$$

$$B(ON) \leftarrow true.$$

These complementary rules are obtained by optimizing the following rules.

$$A(OFF) \leftarrow not\ A(ON).$$

$$B(ON) \leftarrow not\ B(OFF).$$

This means that A(ON) and A(OFF) have a perfectly exclusive relationship as logic. That is, the set space of A is 100% filled with A(ON) and A(OFF). The same applies to B(ON) and B(OFF). As a result, A(ON/OFF) never fails, and either ON or OFF holds.

When the user describes A(ON) and A(OFF) together, (e) is not automatically generated. In such case, the user must fill the set space of A with rules.

Built-in predicates that can describe priority and action are prepared for process rules in addition to function name( ). The built-in predicates and relation description method will be explained below.

(Description of Priority and Action)

A typical example of a built-in predicate used to describe priority will be mentioned.

status(function name, value)

This built-in predicate returns true if the current value of a function name designated as an argument is a designated value; otherwise, false.

For a rule, its action can be described. A typical example will be mentioned below.

On the right-hand side, an action to be executed when a rule is true is described in { }. As a built-in predicate in { }, Message( ) that displays a message, and Enable, Disable, Show, Hide, and the like used in control can be used. Priority and action can be designed in correspondence with the rule format as an optional expression format.

(Built-In Predicate and Default Value)

A status variable of function A can be received by variable _X using built-in predicate status(A, _X). After the conflict process rule description file 301 is loaded, the inference engine 302 automatically generates the following rules for all rule names which appear.

$$A(\_X) \leftarrow status(A, \_X).$$

$$B(\_X) \leftarrow status(B, \_X).$$

$$C(\_X) \leftarrow status(C, \_X).$$

$$A(ON) \leftarrow B(ON), C(OFF).$$

The status value of A becomes ON upon applying the aforementioned rule. If B has no rules except for that which is automatically generated, $$B(\_X) \leftarrow status(B, \_X).$$

is applied. Since this automatically generated rule is always true, the status variable value ON of B is unified to _X to be the status value of rule B.

(Satisfaction Mechanism of Status Variable)

A satisfaction process is done for all rules associated with a confirmed status variable.

EXAMPLE $$C(ON) \leftarrow A(ON).$$

$$B(OFF) \leftarrow A(ON).$$

$$A(ON).$$

When the status variable of A is confirmed, ON satisfies A, and OFF and ON respectively satisfy B and C which refer to A. The satisfaction process is done for all rules associated with a confirmed status variable.

(Set Constraint Reason)

A reason for the result of a status variable can be set using sreason(R).

EXAMPLE $$B(OFF) \leftarrow A(OFF), \{sreason(R)\}.$$

A reason for a case wherein A is OFF, and B is also OFF is set in R. A reason upon generation of a conflict or the like can be extracted later. For example, when $$A(ON) \leftarrow B(ON), C(OFF).$$

is described in the conflict process rule description file 301, status variables having the same names are respectively present for printer functions A, B, and C which appear in the conflict process rule description file 301, as shown in the status variable list 304 in FIG. 4.

(Contents of Processing of Printer Driver UI Control Module 2042)

The processing of the printer driver UI control module 2042 including the conflict process will be described in detail below using the flow chart in FIG. 5.

The processing of the printer driver UI control module 2042 starts when the user instructs to open the printer driver UI using, e.g., the keyboard controller KBC 5 or the like. When the user instructs to open the printer driver UI, the print process related program 204 is loaded onto the RAM 2 under the control of the OS 205. Since the print process related program 204 is a program for generating print data which is described using a page description language, it is a module commonly used for a plurality of printers of an identical series. For this reason, when a print request is issued, the print process related program 204 must launch the printer driver UI that the user instructed to open.

When the print process related program 204 is loaded onto the RAM 2, the inference engine 302 loads the conflict process rule description file 301 onto the RAM 2 via the conflict manager 303 as an initialization process for opening the printer driver UI (step S501).

New complementary rules are generated for rules having 2-status values (ON and OFF) as values on the basis of the conflict process rules loaded in step S501 (step S502). For example, assume that the conflict process rule description file 301 is described as follows.

$$A(ON) \leftarrow B(ON), C(OFF). \tag{f}$$

$$A(ON) \leftarrow D(V1). \tag{g}$$

$$B(OFF) \leftarrow E(OFF). \tag{h}$$

In this case, both (f) and (g) describe identical status ON for single printer function A, and another expression ((h) in this case) has no description about A(OFF). When the conflict process rule description file 301 describes either ON or OFF for a single printer function on the left-hand side, the inference engine 302 automatically generates an ON/OFF-inverted rule for that expression, as described above. Therefore, in case of this example, the inference engine 302 generates $$A(OFF) \leftarrow not\ A(ON). \tag{i}$$

for (f) and (g), and generates $$B(ON) \leftarrow not\ B(OFF). \tag{j}$$

for (h). Automatically generated rules (i) and (j) are optimized in terms of processing efficiency, and are rewritten as:

$$A(OFF) \leftarrow true. \tag{i)'}$$

$$B(ON) \leftarrow true. \tag{j)'}$$

Note that the meanings of these expressions remain the same.

When the inverted rules are automatically generated as in the above example, A(ON) and A(OFF) have a perfectly exclusive relationship in consideration of logic. That is, the set space of printer function A is 100% filled with A(ON) and A(OFF). The same applies to B(ON) and B(OFF).

When A(ON) and A(OFF) are described together, (i) and (i)' are not automatically generated. In this case, all cases must be exhaustively described to 100% fill the set space of A.

Subsequently, conflict process rules associated with initialization of values of printer function names used in the status variable list 304 and conflict process rule generation file 301 are automatically generated as complementary rules (step S503).

All printer function names described in the conflict process rule generation file 301 respectively have status variables in the status variable list 304 included in the conflict manager 303. These status variable values link with the values of corresponding members of the internal structure 304 used by the printer driver UI 306. The initial values of the status variables of the respective function names become the values of the members of the internal structure 305.

For example, in FIG. 4, since the initial value of int cA described in the internal structure 305 is 0, the value of printer function A in the status variable list 304 corresponding to that value is OFF. Therefore, the initial value of status of printer function A of a complementary rule described in the inference engine 302 is OFF.

After that, the inference engine 302 refers to the conflict process rule description file 301 to make conflict check inference. For example, as shown in FIG. 4, if

A(ON)←B(ON), C(OFF)

described in the conflict process rule description file 301 is true, the inference engine 302 changes the status variable value of printer function A in the status variable list 304 from the initial value OFF to ON. Upon completion of conflict check inference, the conflict manager reflects the changed status variable value in corresponding member int cA of the internal structure 304. That is, since the above rule is true, int cA is changed from 0 to 1.

The inference engine 302 can receive the status variable value of printer function A in variable _X used in the inference engine 302 using built-in function status(a, _X). The inference engine 302 loads the conflict process rule description file 301, and then automatically generates the following rules for all rule names that appear in the conflict process rules.

A(_X)←status(A, _X).

B(_X)←status(B, _X).

C(_X)←status(C, _X).

This means that the value of the corresponding member in the internal structure 305 becomes the status value of that printer function name if no other rules to be applied are available.

For A, since

A(ON)←B(ON), C(OFF).

is true, the status value of A becomes ON upon applying the aforementioned rule. If B has no rules except for that which is automatically generated, B(_X)←status(B, _X).

is applied. Since this automatically generated rule is always true, the status variable value ON of B is unified to _X to be the status value of rule B. That is, as for a printer function which has no user-defined rules or no true ones if such rules are present, the value stored in the corresponding member of the internal structure 304 is used as the status value of that printer function.

FIG. 7 shows an example wherein the rules generated in steps S502 and S503 are additionally written in the original conflict process rule description file 301 shown in FIG. 6. In step S502, (4) generated from (1) and (2), and (5) generated from (3) are additionally written as complementary rules. Furthermore, (6) to (9) are additionally written in step S503.

Another initialization process required to open the printer driver UI 306 is then executed, and the printer driver UI shown in FIG. 8 is opened (step S504).

After the printer driver UI 306 is opened, an event sent from the OS is acquired, and a process for that event is repeated (step S505).

It is then checked if an event acquired in step S505 is one generated when the user has changed a setup item on the printer driver UI 306 (step S506). If NO in step S506, the flow advances to step S512 to check if the acquired event is a close request of the printer driver UI 306. If YES in step S512, the flow advances to step S513 to execute an end process, thus closing the printer driver UI 306 and ending all processes. On the other hand, if it is determined in step S512 that the acquired event is not a close request, the flow returns to step S505 to repeat the aforementioned processes.

If it is determined in step S506 that the event acquired in step S505 is a user's setup change request, the flow advances to step S507 to apply new conflict process rules generated by the processes from steps S501 to S503.

As an example of a case wherein the acquired event is a user's setup change request, a case will be exemplified below wherein the user has changed 1-Sided Printing 801 in the [Print Style] column 80 in FIG. 8 to Booklet Printing 803. At this time, values of members Collate, Group, Staple, and Layout present as those of the internal structure 305 before application of the conflict process rules, i.e., before the setup change request are as follows.

Collate OFF
Group ON
Staple OFF
Layout 1-Sided

Since the user's change request instructs to change from 1-Sided to Booklet, the contents of member Layout are changed, and the values of the respective members of the internal structure 305 become as follows.

Collate OFF
Group ON
Staple OFF
Layout Booklet

Then, the printer driver UI 306 calls the conflict manager 303 to update the status variable of Layout in the status variable list 304. Subsequently, the inference engine 302 is called to start application of the conflict process rules. First, rules (6) to (9) in FIG. 7 are applied to initialize the printer function names in the inference engine 302 to the values of the respective members of the status variable list. Rule (3) in FIG. 7 is then applied and, as a result, the value of Group changes from ON to OFF as follows.

Collate OFF
Group OFF
Staple OFF
Layout Booklet

Furthermore, rule (4) in FIG. 7 is applied, and Collate changes from OFF to ON.

Collate ON
Group OFF
Staple OFF
Layout Booklet

If no more rules to be applied remain, application of the conflict process rules in the inference engine 302 ends.

The conflict manager 303 updates the status variable list on the basis of the application result of the conflict process rules in step S507 (step S508), and then updates the internal structure 305 (step S509).

The printer driver UI 306 refers to the values of the members of the internal structure 304 to check if the UI must be updated (step S510). If NO in step S510, the flow returns to step S505 to repeat the aforementioned processes. If the UI must be updated, the UI is updated (step S511), and the flow then returns to step S505 to repeat the aforementioned processes. In the above example, since the setup of Layout has been changed from 1-Sided Printing to Booklet Printing, Collate changes from OFF to ON, and Group changes from ON to OFF. Hence, the printer driver UI is updated from the state shown in FIG. 8 to that shown in FIG. 9.

The aforementioned processes are repeated until the printer driver UI 306 is closed. When the printer driver UI

306 is closed, the processing ends, and that of the print process related program 204 also ends. Then, the print process related program 204 is cleared from the RAM 2 by the function of the OS 205.

Upon executing the update process of the printer driver UI, a process for updating the printer driver UI may be described in the conflict process rule description file 301, and when the inference engine 302 interprets that description, it may directly update the printer driver UI via the status variable list 304 of the conflict manager 303.

FIG. 10 shows a case wherein a description {disable} as a UI update process is added to a line next to (3) in the additionally written conflict process rules shown in FIG. 7. With this description, a process for disabling Group radio button control in FIG. 9 (process for disabling a setup) is implemented as a part of the application contents of the conflict process rules.

Furthermore, as shown in FIG. 11, a message box display process that allows information display to the user can be added to the conflict process rules. For example, a description {Message(MSG001)} of a line next to {disable} In FIG. 11 instructs to display a message box, as shown in FIG. 12.

Figure 12:
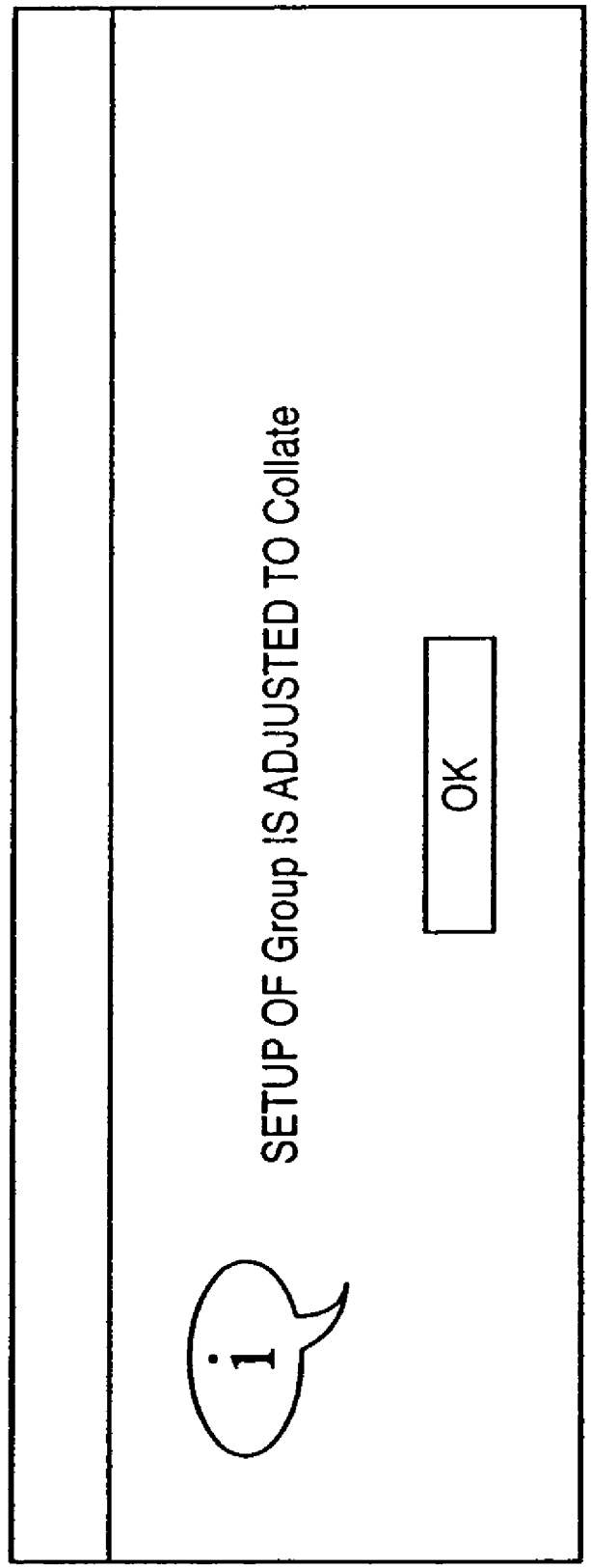
FIG. 12 shows an example of a message box in the embodiment.

"MSG001" is an ID that designates a character string of message text "Setup of Group is adjusted to Collate" displayed in FIG. 12, and ID: MSG001 and the character string indicated by that ID are present as character string resources in the conflict manager 303.

An example of putting descriptions of the conflict process rules in a markup language (e.g., XML (Extensible Markup Language)) will be explained below.

FIG. 13 shows a description example of the conflict process rules in the markup language. As shown in FIG. 13, a conflict process rule portion is described between <conflict rules> tags, and respective rules are bounded by <rule> tags. Arbitrary tag names may be used as long as they can designate a structure.

The conflict process rules can be categorized into rules (universal rules) that can be commonly applied to many printer models, and rules (local rules) that can be applied to only a specific printer model. In this case, for example, universal rules can be bounded by <conflict rules, universal> tags, and local rules can be bounded by <conflict rules, local> tags.

Figure 14:
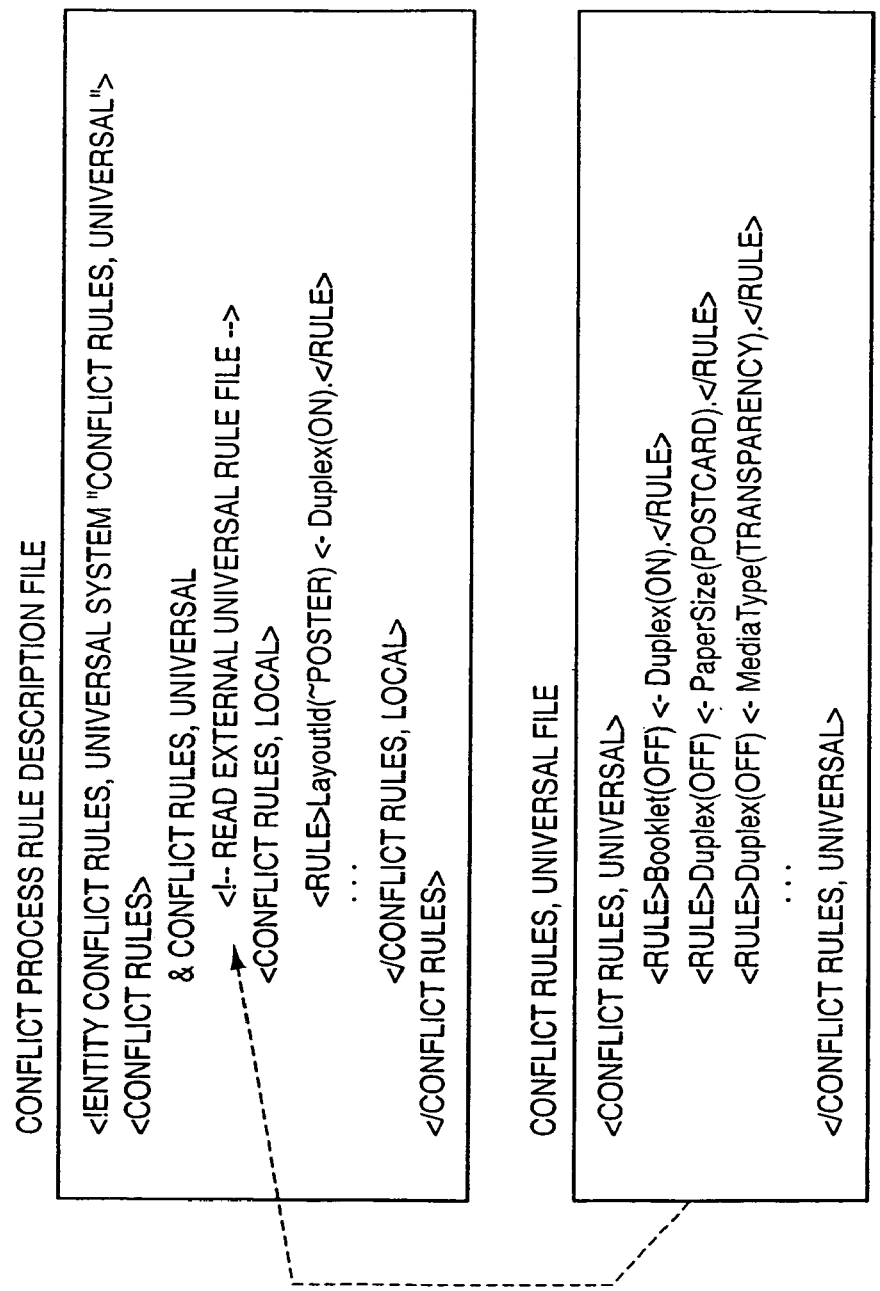
FIG. 14 shows a description example of conflict process rules in a markup language in the embodiment.

Furthermore, as shown in FIG. 14, a conflict rule or universal file that describes universal rules alone may be created as an external reference file, and may be included in the conflict process rule description file.

As described above, according to this embodiment, since conflict process rules that complement those prepared by a program developer or the like are automatically generated, a high-quality conflict process can be implemented.

Since rules are described based on logic, one-to-multi function control can be attained. Since dependency spreads via logic, new rules can be easily added. Upon adding a rule, the entire description need not be checked. Since logic is automatically generated, data need not be generated to exhaustively describe all conflict combinations. Since versatile rules are independently prepared, repetitive descriptions are suppressed, thus reducing input errors and the number of correction steps.

Furthermore, since the update process of the user interface and the message process are added to the conflict process rules, coding that allows high readability and easy maintenance for a developer can be implemented.

In addition, since the conflict process rules include the user interface update process and message process together with the conflict process, even when the conflict process rules are changed, the user interface control module itself need not be changed.

Another embodiment that improves the processing efficiency of the main program by allowing the main program and conflict manager in the conflict process program to exchange only information of an item changed by the conflict process while maintaining their independence will be explained below.

FIG. 16 shows an example of another conflict process rule description rules described according to the aforementioned conflict process rule description format. Taking the printer functions displayed in FIG. 8 as an example, a copy set print function corresponding to [Collate] 811, page unit print function corresponding to [Group] 812, and staple finishing function corresponding to [Staple] 813 shown in FIG. 8 are respectively expressed by Collate( ), Group( ), and Staple( ), and an argument is ON or OFF. A print layout function corresponding to the [Print Style] column 80 is expressed by Layout( ), and an argument is one of 1-Sided, 2-Sided, and Booklet.

(1) in FIG. 16 indicates a rule that sets Staple(OFF) when Collate(ON) is set since the user checks [Collate] 811. (2) indicates a rule that similarly sets Staple(OFF) when Group (ON) is set.

In a line next to each line after (3), a description {disable} is added as the UI update process. With this description, after a rule of each line is applied, control of the corresponding item is disabled.

The processing of the printer driver UI control module 2042 including the conflict process according to another embodiment will be described in detail below using the flow chart in FIG. 15.

The processing of the printer driver UI control module 2042 starts when the user instructs to open the printer driver UI using, e.g., the keyboard controller KBC 5 or the like. When the user instructs to open the printer driver UI, the print process related program 204 is loaded onto the RAM 2 under the control of the OS 205.

When the print process related program 204 is loaded onto the RAM 2, the inference engine 302 loads the conflict process rule description file 301 onto the RAM 2 via the conflict manager 303 as an initialization process for opening the printer driver UI (step S1501).

Subsequently, the status variable list 304 used by the conflict manager 303 is generated (step S1503).

All printer function names described in the conflict process rule generation file 301 respectively have status variables in the status variable list 304 included in the conflict manager 303. These status variable values link with the values of corresponding members of the internal structure 304 used by the printer driver UI 306. The initial values of the status variables of the respective function names become the values of the members of the internal structure 305.

For example, in FIG. 4, since the initial value of int cA described in the internal structure 305 is 0, the value of printer function A in the status variable list 304 corresponding to that value is OFF. Therefore, the initial value of status of printer function A of a complementary rule described in the inference engine 302 is OFF. Likewise, the initial values of printer function names B and C are respectively ON and OFF. That is,

A OFF

B ON

C OFF

After that, the inference engine 302 refers to the conflict process rule description file 301 to make conflict check inference. For example, as shown in FIG. 4, if

A(ON)←B(ON), C(OFF)

described in the conflict process rule description file 301 is true, the inference engine 302 changes the status variable value of printer function A in the status variable list 304 from the initial value OFF to ON. That is,

A ON
B ON
C OFF

In this way, the status variable list 304 is initialized.

Upon completion of conflict check inference, the conflict manager reflects the changed status variable value in corresponding member int cA of the internal structure 304. That is, int cA is changed from 0 to 1 since the above rule is true.

Another initialization process required to open a print setup window is then executed, and the print setup window shown in FIG. 7 is opened (step S1504).

After the print setup window is opened, an event sent from the OS is acquired, and a process for that event is executed (step S1505).

It is then checked if an event acquired in step S1505 is one generated when the user has changed a setup item on the print setup window (step S1506). If NO in step S1506, the flow advances to step S1515 to check if the acquired event is a close request of the print setup window. If YES in step S1515, the flow advances to step S1516 to execute an end process, thus closing the print setup window and ending all processes. On the other hand, if it is determined in step S1515 that the acquired event is not a close request, the flow returns to step S1505 to repeat the aforementioned processes.

If it is determined in step S1506 that the event acquired in step S1505 is a user's setup change request, the flow advances to step S1507 to apply generated conflict process rules.

As an example of a case wherein the acquired event is a user's setup change request, a case will be exemplified below wherein the user has changed 1-Sided Printing 801 in the [Print Style] column 80 in FIG. 8 to Booklet Printing 803. At this time, the values of members Collate, Group, Staple, and Layout present as those of the internal structure 305 before application of the conflict process rules, i.e., before the setup change request are as follows.

Collate OFF
Group ON
Staple OFF
Layout 1-Sided

Since the user's change request instructs to change from 1-Sided to Booklet, the contents of member Layout are changed, and the values of the respective members of the internal structure 305 become as follows.

Collate OFF
Group ON
Staple OFF
Layout Booklet

Then, the printer driver UI 306 calls the conflict manager 303 to update the status variable of Layout in the status variable list 304. Subsequently, the inference engine 302 is called to start application of the conflict process rules. Initially, the respective printer function names in the inference engine 302 are initialized to the values of respective members of the status variable list. (5) in FIG. 16 is then applied to disable control, i.e., make grayout display and inhibit a setup, while Staple is OFF. Likewise, (7) and (8) in FIG. 16 are applied to change the value of Collate from OFF to ON and the value of Group from ON to OFF, and control of these items is then disabled.

Collate ON (disable)
Group OFF (disable)
Staple OFF (disable)
Layout BOOKLET

In this way, application of the conflict process rules in the inference engine 302 ends.

The conflict manager 303 updates the status variable list on the basis of the application result of the conflict process rules in step S1507 (step S1508), and then updates the internal structure 305 (step S1509). The printer driver UI 306 is informed of the updated portions (step S1510). As a method for this purpose, some methods such as a method of setting a flag indicating update in the internal structure 305, a method of independently preparing and returning a bit flag or structure indicating update, a method of returning a list of identifiers indicating changed portions, a method of responding to an inquiry from the printer driver UI 306, and the like are available.

The printer driver UI 306 refers to the values of the members of the internal structure 304 to check if the UI must be updated (step S1511). If NO in step S1511, the flow returns to step S1505 to repeat the aforementioned processes. If the UI must be updated, the UI is updated (step S1512), and the flow then returns to step S1505 to repeat the aforementioned processes. In the above example, since the setup of Layout has been changed from 1-Sided Printing to Booklet Printing, Collate changes from OFF to ON, Group changes from ON to OFF, and Collate, Group, and Staple are disabled. Hence, the print setup window is updated from the state shown in FIG. 8 to that shown in FIG. 9.

Note that the UI may be updated by either the conflict manager 303 or the printer driver UI 306 as a main program. For this reason, the changed portion message in step S1510 may be sent after the UI is updated in step S1512. When the printer driver UI 306 executes an update process, an update process focused on only corresponding control can be implemented. On the other hand, when the conflict manager 303 executes an update process, the printer driver UI 306 can execute only related processes other than the conflict process upon a change in given portion, thus improving the overall processing efficiency.

The aforementioned processes are repeated until the print setup window is closed. When the print setup window is closed, the processing ends, and that of the print process related program 204 also ends. Then, the print process related program 204 is cleared from the RAM 2 by the function of the OS 205.

Figure 17:
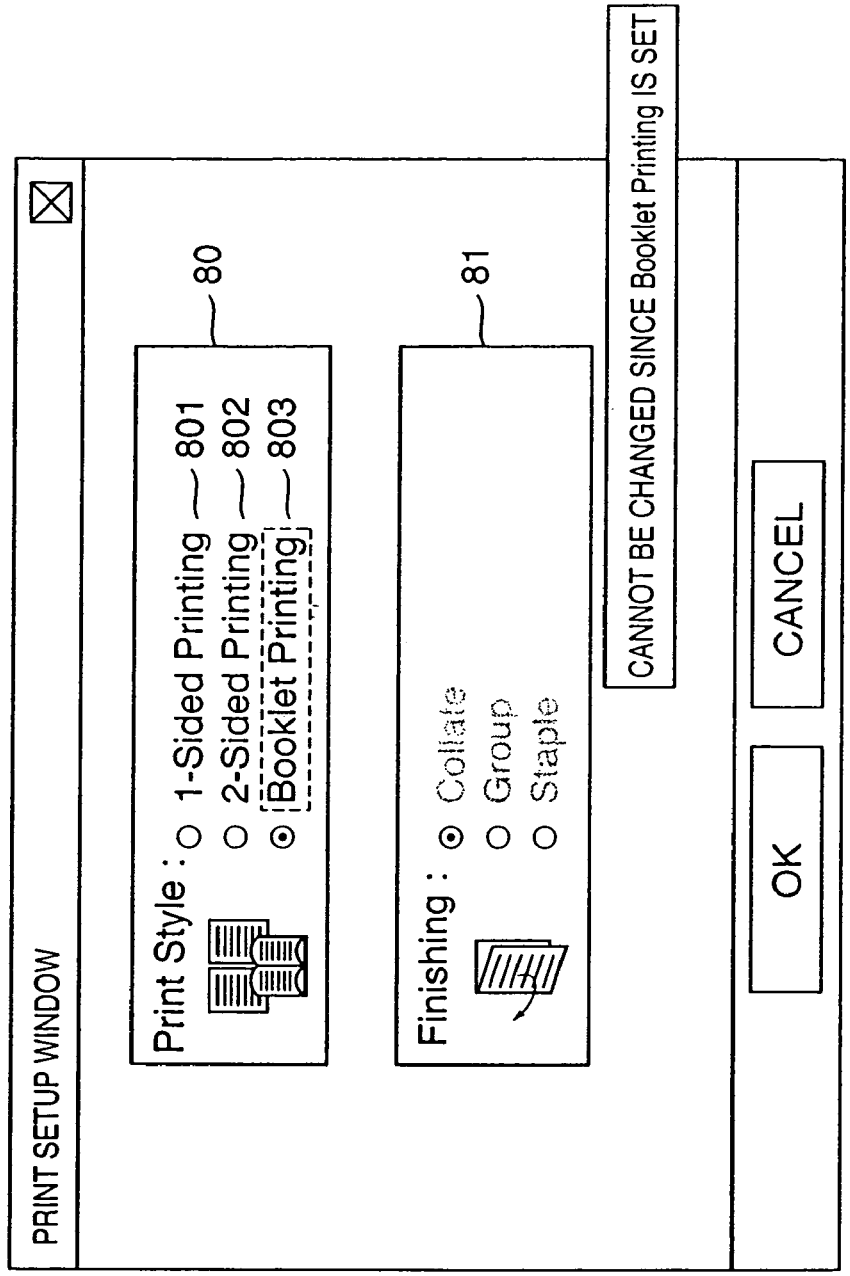
FIG. 17 shows an example of a print setup window in another embodiment.

In the above process, since the printer driver UI 306 can detect control to be changed and another control influenced by that change in steps S1510 to S1512, it can display a reason why the control is not available, as shown in FIG. 17, by recognizing the condition for disabling the control.

ANOTHER EMBODIMENT

In the above embodiments, UI control including the conflict process is executed for the printer apparatus. The present invention is not limited to the printer apparatus, and can be applied to network related devices such as a modem, router, and the like in addition to peripheral devices and control devices such as a digital camera, digital recorder, image scanner, and the like. Also, the present invention can be applied to a system constituted by a plurality of these devices.

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

Figure 5:
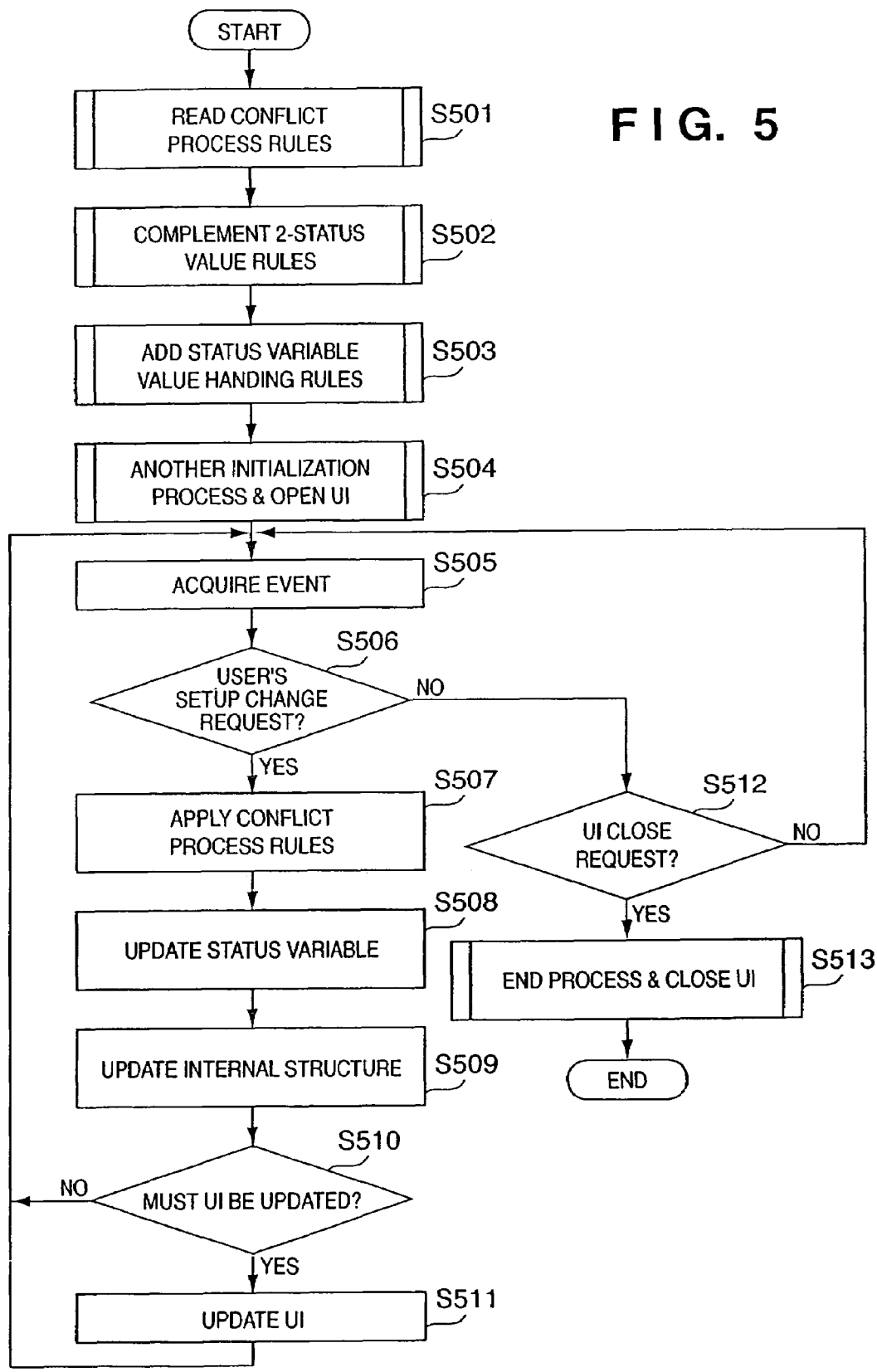
FIG. 5 is a flow chart showing the process of the printer driver UI control module in the embodiment.
Figure 15:
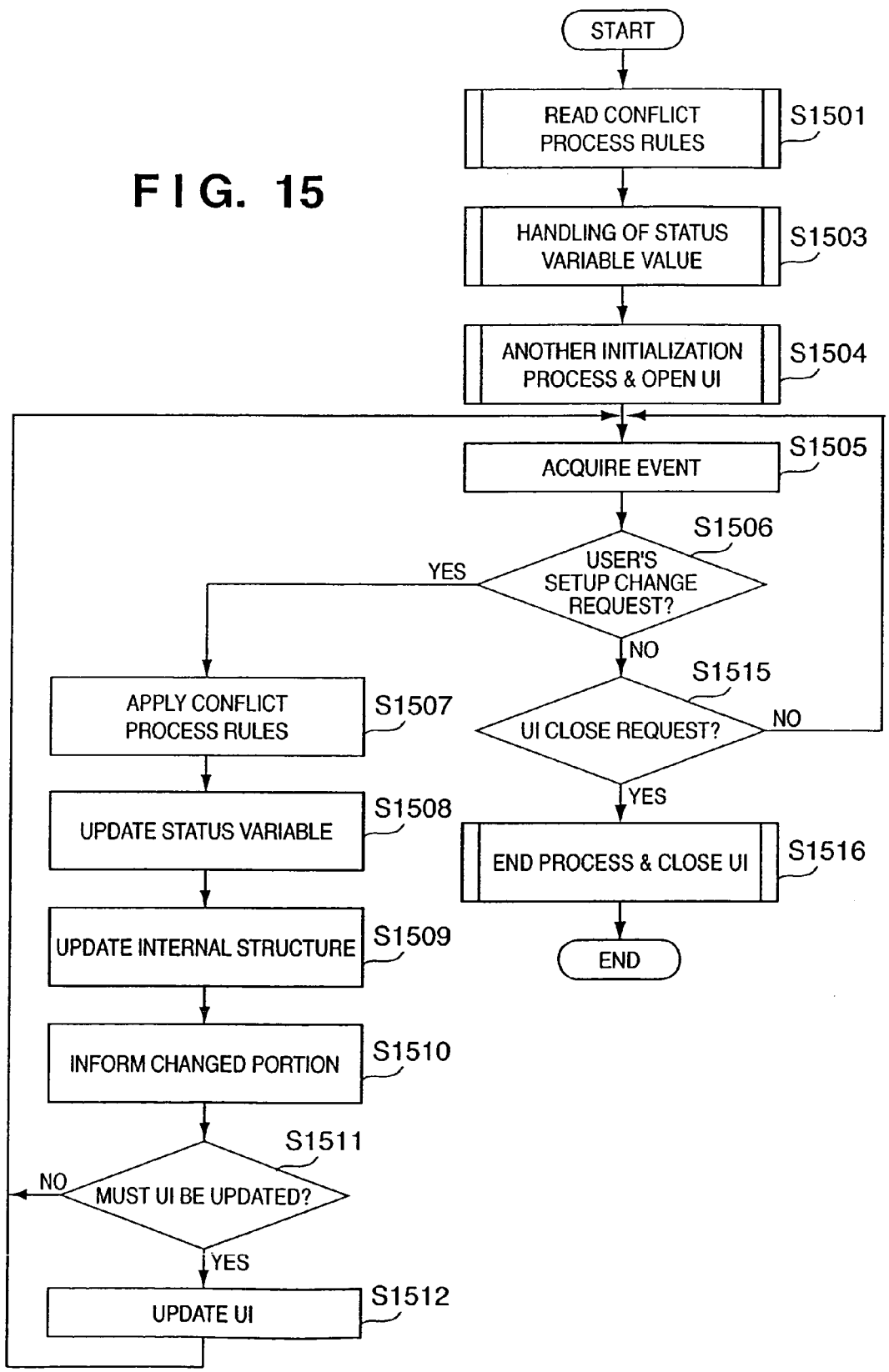
FIG. 15 is a flow chart showing the process of a printer driver UI control module in another embodiment.

When the present invention is applied to the storage medium, that storage medium stores program codes corresponding to the flow chart shown in FIG. 5 or 15 mentioned above.

As described above, according to the present invention, a user interface control apparatus and method, which can implement an exhaustive, reliable conflict process, and can reduce the number of input steps and contrived errors by a program developer or the like by improving a description method of conflict process rules, can be provided.

Also, according to the present invention, a user interface control apparatus and method, which allow a main program and conflict manager in a conflict process program to exchange only information of items changed by a conflict process, while maintaining their independence, thereby improving the processing efficiency of the main program, can be provided.

The present invention is not limited to the above embodiments and various changes and modifications can be made within the spirit and scope of the present invention. Therefore, to apprise the public of the scope of the present invention, the following claims are made.

What is claimed is:

1. An information processing apparatus comprising:
   storage means for storing conflict process rules for determining settings of a printer driver to avoid a conflict between the settings, wherein the conflict process rules include a basic process rule which is described by a logical expression including a value corresponding to the settings;
   generation means for automatically generating an inverted rule as a complementary process rule of the basic process rule based on the logical expression, in a case where the inverted rule of the basic process rule is not defined in the conflict process rules stored in said storage means; and
   resolution means for resolving a conflict between the settings by applying the basic and complementary process rules to the settings.

2. The apparatus according to claim 1, wherein said resolution means determines the presence/absence of the conflict between the settings, which are input from input means for inputting the settings, and applies the basic and complementary process rules to the settings, if any conflict is detected.

3. The apparatus according to claim 1, further comprising:
   interface means for visualizing the settings; and
   display control means for displaying the settings, between which the conflict is resolved by said resolution means, on said interface means.

4. The apparatus according to claim 3, wherein said display control means informs that the settings have been changed upon applying the basic and complementary process rules by said resolution means.

5. An image forming apparatus comprising:
   an information processing apparatus according to claim 1, and
   image forming means for determining control parameters which are input to said information processing apparatus and are used to form an image, and forming image information on the basis of the determined control parameters.

6. The apparatus according to claim 5, wherein said image forming apparatus includes a printer and facsimile.

7. An information processing method comprising:
   a storage step of storing conflict process rules for determining settings of a printer driver to avoid a conflict between the settings, wherein the conflict process rules include a basic process rule which is described by a logical expression including a value corresponding to the settings;
   a generation step of automatically generating an inverted rule as a complementary process rule of the basic process rule based on the logical expression, in case where the inverted rule of the basic process rule is not defined in the conflict process rules stored in said storage step; and
   a resolution step of resolving a conflict between the settings by applying the basic and complementary process rules to the settings.

8. The method according to claim 7, wherein resolution step includes the step of determining the presence/absence of the conflict between the settings, which are input in an input step of inputting the settings, and applying the basic and complementary process rules to the settings, if any conflict is detected.

9. The method according to claim 7, further comprising:
   an interface step of visualizing the settings; and
   a display control step of displaying the settings, between which the conflict is resolved in the resolution step, in the interface step.

10. The method according to claim 9, wherein the display control step includes the step of informing that the settings have been changed upon applying the basic and complementaiy process rules by the resolution step.

11. A program for making a computer implement an information processing method, comprising:
   a storage module for storing conflict process rules for determining settings of a printer driver to avoid a conflict between the settings, wherein the conflict process rules include a basic process rule which is described by a logical expression including a value corresponding to the settings;
   a generation module for automatically generating an inverted rule as a complementary process rule of the basic process rule based on the logical expression, in a case where the inverted rule of the basic process rule is not defined in the conflict process rules stored in said storage module; and a resolution module for resolving a conflict between the settings by applying the basic and complementary process rules to the settings.

12. The program according to claim 11, wherein said resolution module determines the presence/absence of the conflict between the settings, which are input from an input module for inputting the settings, and applies the basic and complementary process rules to the settings, if any conflict is detected.

13. The program according to claim 11, further compnsing:

an interface module for visualizing the settings; and a display control module for displaying the settings, between which the conflict is resolved by said resolution module, in said interface module.

14. The program according to claim 13, wherein said display control module informs that the settings have been changed upon applying the basic and complementary process rules by said resolution module.

15. A computer readable storage medium that stores a program module used to make a computer implement an information processing method, said program module comprising:

a storage module for storing conflict process rules for determining settings of a printer driver to avoid a conflict between the settings, wherein the conflict process rules include a basic process rule which is described by a logical expression including a value corresponding to the settings;

a generation module for automatically generating an inverted rule as a complementary process rule of the basic process rule based on the logical expression, in a case where the inverted rule of the basic process rule is not defined in the conflict process rules stored in said storage module; and a resolution module for resolving a conflict between the settings by applying the basic and complementary process rules to the settings.

* * * * *

UNITED STATES PATENT AND TRADEMARK OFFICE
CERTIFICATE OF CORRECTION

PATENT NO.       : 7,328,224 B2                                         Page 1 of 1
APPLICATION NO.  : 11/391408
DATED            : February 5, 2008
INVENTOR(S)      : Kawamoto et al.

It is certified that error appears in the above-identified patent and that said Letters Patent is hereby corrected as shown below:

COLUMN 10:
   Line 30, "A(OFF)<not A(ON)." should read -- A(OFF)←not A(ON). --.

COLUMN 13:
   Line 21, "In" should read -- in --.

COLUMN 17:
   Line 60, "inverted" should read -- inverse --; and
   Line 62, "inverted" should read -- inverse --.

COLUMN 18:
   Line 33, "inverted" should read -- inverse --;
   Line 35, "in case" should read -- in a case --;
   Line 36, "inverted" should read -- inverse --;
   Line 42, "wherein" should read -- wherein the --;
   Line 56, "mentaiy" should read -- mentary --; and
   Line 66, "inverted" should read -- inverse --.

COLUMN 19:
   Line 1, "inverted" should read -- inverse --; and
   Line 13, "compns-" should read -- compris- --.

COLUMN 20:
   Line 12, "inverted" should read -- inverse --; and
   Line 14, "inverted" should read -- inverse --.

Signed and Sealed this

Eleventh Day of November, 2008

JON W. DUDAS
*Director of the United States Patent and Trademark Office*